US010635971B1

(12) United States Patent
Chelian et al.

(10) Patent No.: US 10,635,971 B1
(45) Date of Patent: Apr. 28, 2020

(54) METHOD AND APPARATUS FOR PROACTIVE AND REACTIVE COGNITIVE CONTROL USING MODELS OF THE ANTERIOR CINGULATE CORTEX AND THE NEUROMODULATORY SYSTEM

(71) Applicant: HRL Laboratories, LLC, Malibu, CA (US)

(72) Inventors: Suhas E. Chelian, San Jose, CA (US); Matthias Ziegler, Agoura Hills, CA (US); James Benvenuto, Beverly Hills, CA (US); Jeffrey Lawrence Krichmar, Cardiff By the Sea, CA (US); Randall C. O'Reilly, Boulder, CO (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 844 days.

(21) Appl. No.: 14/955,722

(22) Filed: Dec. 1, 2015

Related U.S. Application Data

(60) Provisional application No. 62/086,886, filed on Dec. 3, 2014.

(51) Int. Cl.
  *G06N 7/00* (2006.01)
  *G06N 20/00* (2019.01)
  *G06N 3/08* (2006.01)
(52) U.S. Cl.
  CPC .............. *G06N 3/08* (2013.01); *G06N 7/005* (2013.01); *G06N 20/00* (2019.01)
(58) Field of Classification Search
  None
  See application file for complete search history.

(56) References Cited

U.S. PATENT DOCUMENTS

| 6,269,351 | B1* | 7/2001 | Black | G06F 17/3061 |
| | | | | 706/15 |
| 8,595,157 | B2* | 11/2013 | Cruz-Albrecht | G06N 3/049 |
| | | | | 706/12 |

(Continued)

OTHER PUBLICATIONS

Lebiere et al., A Functional Model of Sensemaking in a Neurocognitive Architecture, Computational Intelligence and Neuroscience, 921695 (2013) at 1-19 (Year: 2013).*

(Continued)

*Primary Examiner* — Li B. Zhen
*Assistant Examiner* — Markus A. Vasquez
(74) *Attorney, Agent, or Firm* — Tope-McKay & Associates

(57) ABSTRACT

Described is a system for proactive and reactive cognitive control using a neural module. The system calculates, for each hypothesis of a set of hypotheses, a probability that an event will occur. The neural module comprises a plurality of neurons and includes the PC module, a prefrontal cortex (PFC) module, an anterior cingulate cortex (ACC) module, a locus coeruleus (LC) module, and a basal forebrain (BF) module. The set of hypotheses are related to tasks to be performed by a plurality of groups, each group having a corresponding hypothesis. For each probability, the system calculates a conflict value across all hypotheses with the ACC module, compares each conflict value to a predetermined threshold using the BF and LC modules. A determination is made whether to directly output the calculated probability or perform an additional probability calculation and output an updated probability.

18 Claims, 11 Drawing Sheets

(56) References Cited

U.S. PATENT DOCUMENTS

| | | | |
|---|---|---|---|
| 8,930,291 B1 | 1/2015 | Srinivasa et al. | |
| 8,977,578 B1 | 3/2015 | Cruz-Albrecht et al. | |
| 8,996,431 B2 | 3/2015 | Cruz-Albrecht et al. | |

OTHER PUBLICATIONS

Chelian, Model of the Interactions between Neuromodulators and Prefrontal Cortex during a Resource Allocation Task, In Proc. of the IEEE International Conference on Development and Learning and Epigenetic Robotics (2012) at pp. 1-6 (Year: 2012).*

Brenych, The K-Winners-Take-All Neural Network of Classification, CADSM 2013 at pp. 43-44. (Year: 2013).*

Aisa, B., Mingus, B. & O'Reilly, R. (2008). The emergent neural modeling system. Neural Networks, 21, pp. 1146-1152.

Alexander, W.H. & Brown, J.W. (2010). Computational models of performance monitoring and cognitive control. Topics in Cognitive Science, 2, pp. 658-677.

Alexander, W.H., & Brown, J.W. (2011). Medial prefrontal cortex as an action-outcome predictor. Nature Neuroscience, 14, pp. 1338-1344.

Avery, M.C., Dutt, N., & Krichmar, J.L. (2014). Mechanisms underlying the basal forebrain enhancement of top-down and bottom-up attention. The European Journal of Neuroscience, 39, pp. 852-865.

Avery, M.C., Nitz, D.A., Chiba, A.A., & Krichmar, J.L. (2012). Simulation of cholinergic and noradrenergic modulation of behavior in uncertain environments. Frontiers in Computational Neuroscience, 6, pp. 1-16.

Bouret, S., & Sara, S.J. (2005). Network reset: a simplified overarching theory of locus coeruieus noradrenaline function. Trends in Neuroscience, 28, pp. 574-582.

Botvinick, M.M., Braver, T.S., Carter, C.S., Barch, D.M., & Cohen, J.D. (2001). Conflict monitoring and cognitive control. Psychological Review, 108, pp. 624-652.

Broussard, J.I., Karelina, K., Sarter, M., & Givens, B. (2009). Cholinenergic optimization of cue-evoked parietal activity during challenged attentional performance. European Journal of Neuroscience, 29, pp. 1711-1722.

Chelian, S.E., Oros, N., Zaldivar, A., Krichmar, J., & Bhattacharyya, R. (2012). Model of the interactions between neuromodulators and prefrontal cortex during a resource allocation task. In Proceedings of the IEEE International Conference on Development and Learning and Epigenetic Robotics, San Diego, USA.

Dalley, J.W., McGaughy, J., O'Connell, M.T., Cardinal, R.N., Levita, L., & Robbins, T.W. (2001). Distinct changes in cortical acetylcholine and noradrenaline efflux during contingent and noncontingent performance of a visual attentional task. Journal of Neuroscience, 21, pp. 4908-4914.

Disney, A.A., Aoki, C., & Hawken, M.J. (2007). Gain modulation by nicotine in macaque V1. Neuron, 56, pp. 701-713.

Doya, K. (2002). Metalearning and neuromodulation. Neural Networks, 15, pp. 495-506.

Goard, M., & Dan, Y. (2009). Basal forebrain activation enhances cortical coding of natural sciences. Nature Neuroscience, 12, pp. 1444-1449.

Herd, S.A., Krueger, K.A., Kriete, T.E., Huang, T. & O'Reilly, R.C. (2013). Strategic cognitive sequencing: a computational cognitive neuroscience approach. Computational Intelligence and Neuroscience, 149329.

Herrero, J.L., Roberts, M.J., Delicato, L.S., Gieselmann, M.A., Dayan, P., & Thiele, A. (2008). Acetylcholine contributes through muscarinic receptors to attentional modulation in V1. Nature, 454, pp. 1110-1114.

Jacobsen, C.F. (1935). Functions of frontal association area in primates. Archives of Neurology and Psychiatry, 33, pp. 558-569.

Krichmar, J.L. (2008). The neuromodulatory system—a framework for survival and adaptive behavior in a challenging world. Adaptive Behavior, 16, pp. 385-399.

Laming, D. (1979). Choice reaction performance following an error. Acta Psychologica, 43, pp. 199-224.

Lebiere, C. (1999). The dynamics of cognition. An ACT-R model of cognitive arithmetic. Kognitionswissenschaft, 8, pp. 5-19.

Lebiere, C., Pirolli, P., Thomson, R., Paik, J., Rutledge-Taylor, M., Staszewski, J., & Anderson, J. R. (2013) A functional model of sensemaking in a neurocognitive architecture. Computational Intelligence and Neuroscience, 921695.

Nee, D.E., Kastner S., & Brown J.W. (2011) Functional heterogeneity of conflict, error, task-switching, and unexpectedness effects within medial prefrontal cortex. NeuroImage, 54, pp. 528-540.

Nelson, C.L., Sarter, M., & Bruno, J.P. (2005). Prefrontal cortical modulation of acetylcholine release in posterior parietal cortex. Neuroscience, 132, pp. 347-359.

Rabbitt, P.M. (1966). Errors and error correction in choice-response tasks. Journal of Experimental Psychology, 71, pp. 264-272.

Sara, S.J. (2009). The locus coeruleus and noradrenergic modulation of cognition. Nature Reviews Neuroscience, 10, pp. 211-223.

Shenhav, A., Botvinick, M.M., & Cohen, J.D. (2013). The expected value of control: an integrative theory of anterior cingulate cortex function. Neuron, 79, pp. 217-240.

Stroop, J.R. (1935). Studies of interference in serial verbal reactions. Journal of Experimental Psychology, 18, pp. 643-662.

Sun, Y., & Wang, H. (2013). The parietal cortex in sensemaking: the dissociation of multiple types of spatial information. Computational Intelligence and Neuroscience, 152073.

* cited by examiner

METHOD AND APPARATUS FOR PROACTIVE AND REACTIVE COGNITIVE CONTROL USING MODELS OF THE ANTERIOR CINGULATE CORTEX AND THE NEUROMODULATORY SYSTEM

GOVERNMENT LICENSE RIGHTS

This invention was made with government support under U.S. Government Contract Number D10PC20021 ICArUS-MINDS. The government has certain rights in the invention.

CROSS-REFERENCE TO RELATED APPLICATIONS

This is a Non-Provisional Application of U.S. Provisional Patent Application No. 62/086,886 filed Dec. 3, 2014, entitled, "Method and Apparatus for Proactive and Reactive Cognitive Control Using Models of the Anterior Cingulate Cortex and the Neuromodulatory System," the entirety of which is incorporated herein by reference.

BACKGROUND OF INVENTION

(1) Field of Invention

The present invention relates to a system for modeling proactive and reactive cognitive control and, more particularly, to a system for modeling proactive and reactive cognitive control through coordination of several brain areas.

(2) Description of Related Art

Typically models of cognitive control are demonstrated on simple tasks such as the Stroop task (see the List of Incorporated Literature References, Literature Reference No. 26). With respect to models of the anterior cingulate cortex (ACC), broader theories of the ACC such as the Predicted Response-Outcome PRO model (described in Literature Reference No. 3) and the Expected Value of Control (EVC) model (see Literature Reference No. 25) attempt to unify several cognitive control functions of the ACC, including conflict and surprise, with various objective functions. These models are also tied to neuroimaging and neurophysiological studies, but do not discuss the effects of the neuromodulatory system.

With respect to models of the neuromodulatory system, Doya (see Literature Reference No. 12) has also presented alternate interpretations of the neuromodulatory functions. His work primarily considered reactive control in a reinforcement learning framework.

Thus, a continuing need exists for a system for modeling proactive and reactive cognitive control to produce better fits to human data in relatively complicated inference and decision-making tasks.

SUMMARY OF THE INVENTION

The present invention relates to a system for modeling proactive and reactive cognitive control and, more particularly, to a system for modeling proactive and reactive cognitive control through coordination of several brain areas. The system comprises one or more processors and a memory having instructions such that when the instructions are executed, the one or more processors perform multiple operations. The system uses a neural module comprising a plurality of neurons and having a parietal cortex (PC) module, a prefrontal cortex (PFC) module, an anterior cingulate cortex (ACC) module, a locus coeruleus (LC) module, and a basal forebrain (BF) module. In an initial trial, a set of hypotheses for tasks to be performed by a plurality of groups is received, each group having a corresponding hypothesis. For each hypothesis, a task probability that a task is going to be performed by the group according to the hypothesis is calculated with the PC module, resulting in a set of task probabilities. For each task probability, the following set of proactive cognitive control operations are performed. A conflict value across each hypothesis is calculated with the ACC module. Each conflict value is compared to a predetermined threshold using the BF and LC modules to determine whether to: (a) directly output the calculated task probability; or (b) perform an additional task probability calculation and output an updated task probability. For each task probability output, the following set of reactive cognitive control operations are performed. If the task probability contains an error, then a surprise value for the task probability is calculated with the ACC module. If the surprise value exceeds a predetermined threshold, then the calculation of the task probability is improved in a subsequent trial using additional resources. The set of task probabilities is used for decision making related to the task.

In another aspect, the neural module is a distinct hardware component of the system for modeling proactive and reactive cognitive control. Embodiments of this module are described in issued U.S. Patents identified in Literature References 28-31.

In another aspect, if the surprise value exceeds the predetermined threshold, then the PFC module is used to assess a utility of each of a set of options for reactive cognitive control, and select the option having the highest utility to improve the calculation of the task probability in the subsequent trial.

In another aspect, the set of options comprises a maintain option that maintains a current level of PC module engagement, an increase option that increases the level of PC module engagement by providing additional information regarding the plurality of groups, and a randomize option that is selected when all additional information regarding the plurality of groups has been utilized.

In another aspect, conflict values that exceed the predetermined threshold are relayed from the ACC module to the BF module to increase attention in the PC module through an increase in competition between a plurality of neurons, thereby increasing distinction between task probabilities.

In another aspect, surprise values that exceed the predetermined threshold are relayed from the ACC module to the LC module to trigger a re-evaluation of spatial strategies used by the PC module.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
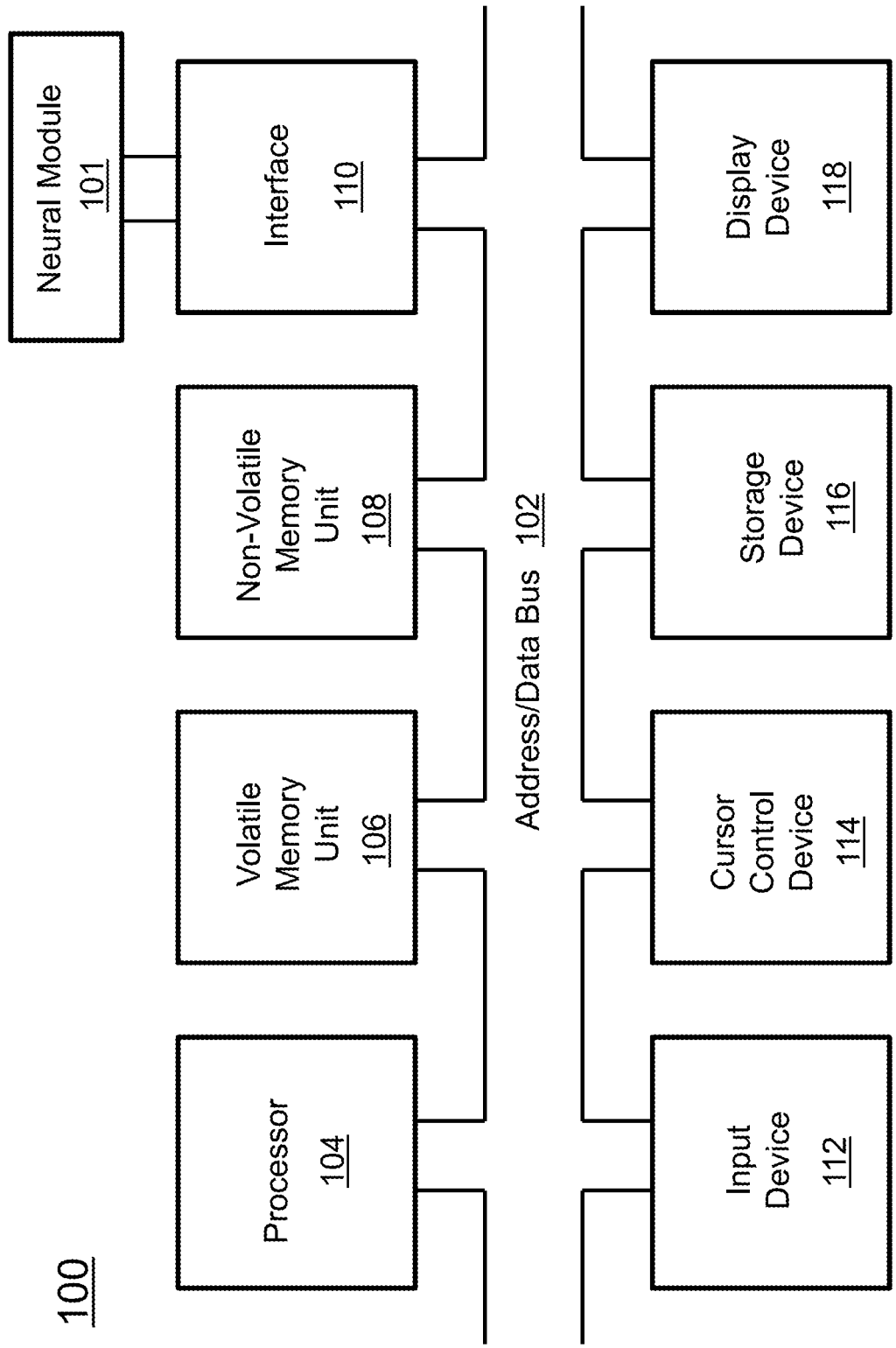
FIG. 1 is a block diagram depicting the components of a system for modeling proactive and reactive cognitive control according to various embodiments of the present invention.

The present invention relates to a system for modeling proactive and reactive cognitive control, more particularly, to a system for modeling proactive and reactive cognitive control through coordination of several brain areas. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Following that is an introduction that provides an overview of the present invention. Next, a description of various principal aspects of the present invention is provided. Finally, specific details of the present invention are provided to give an understanding of the specific aspects.

(1) List of Incorporated Literature References and U.S. Patents

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Aisa, B., Mingus, B. & O'Reilly, R. (2008). The emergent neural modeling system. Neural Networks, 21, 1146-1152.
2. Alexander, W. H. & Brown, J. W. (2010). Computational models of performance monitoring and cognitive control. Topics in Cognitive Science, 2, 658-677.
3. Alexander, W. H., & Brown, J. W. (2011). Medial prefrontal cortex as an action-outcome predictor. Nature Neuroscience, 14, 1338-1344.
4. Avery, M. C., Dutt, N., & Krichmar, J. L. (2014). Mechanisms underlying the basal forebrain enhancement of top-down and bottom-up attention. The European Journal of Neuroscience, 39, 852-865.
5. Avery, M. C., Nitz, D. A., Chiba, A. A., & Krichmar, J. L. (2012). Simulation of cholinergic and noradrenergic modulation of behavior in uncertain environments. Frontiers in Computational Neuroscience, 6, 1-16.
6. Bouret, S., & Sara, S. J. (2005). Network reset: a simplified overarching theory of locus coeruleus noradrenaline function. Trends in Neuroscience, 28, 574-582.
7. Botvinick, M. M., Braver, T. S., Carter, C. S., Barch, D. M., & Cohen, J. D. (2001). Conflict monitoring and cognitive control. Psychological Review, 108, 624-652.
8. Broussard, J. I., Karelina, K., Saner, M., & Givens, B. (2009). Cholinergic optimization of cue-evoked parietal activity during challenged attentional performance. European Journal of Neuroscience, 29, 1711-1722.
9. Chelian, S. E., Oros, N., Zaldivar, A., Krichmar, J., & Bhattacharyya, R. (2012). Model of the interactions between neuromodulators and prefrontal cortex during a resource allocation task. In Proceedings of the IEEE International Conference on Development and Learning and Epigenetic Robotics, San Diego, USA.
10. Dalley, J. W., McGaughy, J., O'Connell, M. T., Cardinal, R. N., Levita, L., & Robbins, T. W. (2001). Distinct changes in cortical acetylcholine and noradrenaline efflux during contingent and noncontingent performance of a visual attentional task. Journal of Neuroscience, 21, 4908-4914.
11. Disney, A. A., Aoki, C., & Hawken, M. J. (2007). Gain modulation by nicotine in macaque V1. Neuron, 56, 701-713.
12. Doya, K. (2002). Metalearning and neuromodulation. Neural Networks, 15, 495-506.
13. Goard, M., & Dan, Y. (2009). Basal forebrain activation enhances cortical coding of natural scenes. Nature Neuroscience, 12, 1444-1449.
14. Herd, S. A., Krueger, K. A., Kriete, T. E., Huang, T. & O'Reilly, R. C. (2013). Strategic cognitive sequencing: a computational cognitive neuroscience approach. Computational Intelligence and Neuroscience, 149329.
15. Herrero, J. L., Roberts, M. J., Delicato, L. S., Gieselmann, M. A., Dayan, P., & Thiele, A. (2008). Acetylcholine contributes through muscarinic receptors to attentional modulation in V1. Nature, 454, 1110-1114.
16. Jacobsen, C. F. (1935). Functions of frontal association area in primates. Archives of Neurology and Psychiatry, 33, 558-569.
17. Krichmar, J. L. (2008). The neuromodulatory system—a framework for survival and adaptive behavior in a challenging world. Adaptive Behavior, 16, 385-399.
18. Laming, D. (1979). Choice reaction performance following an error. Acta Psychologica, 43, 199-224.
19. Lebiere, C. (1999). The dynamics of cognition: An ACT-R model of cognitive arithmetic. Kognitionswissenschaft, 8, 5-19.
20. Lebiere, C., Pirolli, P., Thomson, R., Paik, J., Rutledge-Taylor, M., Staszewski, J., & Anderson, J. R. (2013). A functional model of sensemaking in a neurocognitive architecture. Computational Intelligence and Neuroscience, 921695.
21. Nee, D. E., Kastner S., & Brown J. W. (2011) Functional heterogeneity of conflict, error, task-switching, and unexpectedness effects within medial prefrontal cortex. NeuroImage, 54, 528-540.
22. Nelson, C. L., Saner, M., & Bruno, J. P. (2005). Prefrontal conical modulation of acetylcholine release in posterior parietal cortex. Neuroscience, 132, 347-359.
23. Rabbitt, P. M. (1966). Errors and error correction in choice-response tasks. Journal of Experimental Psychology, 71, 264-272.
24. Sara, S. J. (2009). The locus coeruleus and noradrenergic modulation of cognition. Nature Reviews Neuroscience, 10, 211-223.
25. Shenhav, A., Botvinick, M. M., & Cohen. J. D. (2013). The expected value of control: an integrative theory of anterior cingulate cortex function. Neuron, 79, 217-240.
26. Stroop, J. R. (1935). Studies of interference in serial verbal reactions. Journal of Experimental Psychology, 18, 643-662.
27. Sun, Y., & Wang, H. (2013). The parietal cortex in sensemaking: the dissociation of multiple types of spatial information. Computational Intelligence and Neuroscience, 152073.
28. U.S. Pat. No. 8,977,578 issued Mar. 10, 2015 titled, "Synaptic time multiplexing neuromorphic network that forms subsets of connections during different time slots."
29. U.S. Pat. No. 8,930,291 issued Jan. 6, 2015 titled, "Cortical neuromorphic network, system and method."
30. U.S. Pat. No. 8,595,157 issued Nov. 26, 2013 titled, "High-Order Time Encoder Based Neuron Circuit Using a Hysteresis Quantizer, A One Bit DAC, And a Second Order Filter."
31. U.S. Pat. No. 8,996,431 issued Mar. 31, 2015 titled, "Spike domain neuron circuit with programmable kinetic dynamic, homeostatic plasticity and axonal delays."

(2) Principal Aspects

The present invention has three "principal" aspects. The first is a system for modeling proactive and reactive cognitive control. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. A component of the computer system 100 is a neural module 101, which is a distinct hardware component of the computer system 100 for modeling proactive and reactive cognitive control. Embodiments of the neural module 101 are described in issued U.S. Patents identified in Literature References 28-31.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment.

Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
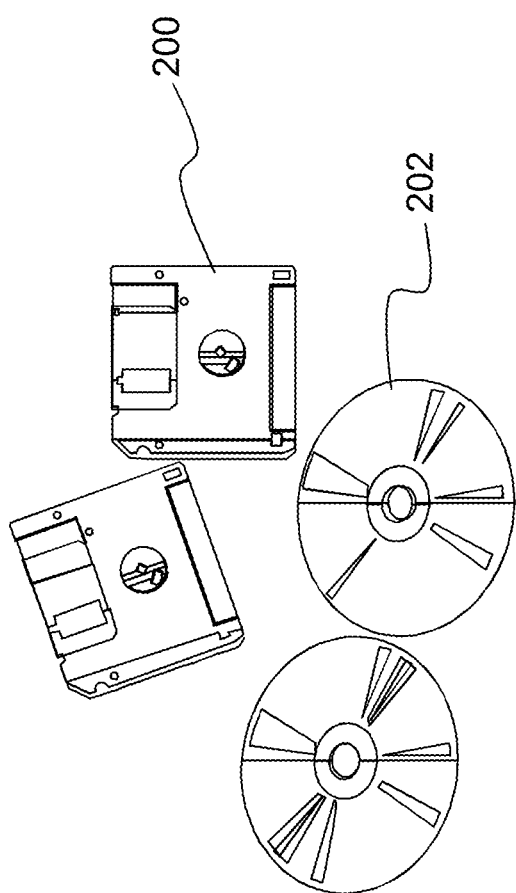
FIG. 2 is an illustration of a computer program product according to various embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The anterior cingulate cortex (ACC) is implicated in a number of functions, including proactive and reactive cognitive control (see Literature Reference No. 2 for a review). Proactive control is applied before feedback is given, while reactive control is applied after feedback. For example, in taking a test, checking a calculation before submitting an answer and then after receiving results, changing the amount of studying one does for the next test are examples of proactive and reactive control in that order.

ACC models of cognitive control (e.g., Literature Reference Nos. 3 and 25) often do not explicitly state how control is exerted on other brain areas in terms of neuronal dynamics. One appealing candidate for the agent of this control is the neuromodulatory system. The neuromodulatory system is bidirectionally connected with the ACC, the prefrontal cortex, and the posterior cortical areas (see Literature Reference No. 17). Within the neuromodulatory system, the basal forebrain, and the locus coeruleus are of particular interest. The basal forebrain (BF) is the source of acetylcholine and appears to modulate attention. For example, BF activity has been shown to increase attentional modulation in downstream cortical targets (see Literature Reference Nos. 11, 13, and 15). BF inputs to posterior cortical neurons amplify cue detection and may also act to suppress irrelevant distractors (see Literature Reference No. 8). Further, BF activity may be regulated by the prefrontal cortex (PFC) to enable top-down control of attention (see Literature Reference No. 22).

The locus coeruleus (LC) is the source of noradrenaline. Its effects are prevalent in cortical regions when there are dramatic environmental changes which cause large shifts in attention (see Literature Reference No. 10) as opposed to the more gradual shifts in attention encoded by the BF. Thus, it has been proposed that the LC functions as a "network reset" to detect large changes, reject prior expectations, and enable the formation of new models of the environment (see Literature Reference Nos. 6 and 24). Models of neuromodulatory control, however, often focus on perceptual or attentional processing (e.g., Literature Reference No. 5).

Described herein is a model of cognitive control over more deliberate processing, such as probability inference calculations and assessing the utility of various factors in spatial reasoning tasks. The model according to various embodiments of the present invention is embedded in a large-scale neurocognitive model implemented in Emergent neural simulation software (see Literature Reference No. 1) that includes nine brain areas (parietal cortex, temporal cortex, hippocampus, prefrontal cortex, basal ganglia, anterior cingulate cortex, orbitofrontal cortex, neuromodulatory system, and thalamus). The multi-region model performs several simulated geospatial tasks each with multiple steps for inference and decision making. For proactive control, a measure of conflict is used to consider a "look-relook" decision. For reactive control, a measure of surprise, derived from error, is used to control the use or disuse of features in a spatial reasoning task. Proactive and reactive control increased the ability to model human performance on the simulated intelligence tasks while minimizing extraneous processing.

(4) Specific Details of the Invention (4.1) Tasks

In the present invention, two tasks, tasks 2 and 3, were considered. Tasks 2 and 3 are a subset of six simulated geospatial intelligence tasks, which are fully described in Literature Reference No. 20. Task 1 was not used because it was an introductory task with limited complexity to introduce humans to subsequent tasks. Tasks 4-6, on the other hand, emphasized updating probability estimates as opposed to spatial processing.

One hundred and three subjects were recruited from intelligence analysis graduate studies programs to complete the tasks, and their inference and decision making was modeled using a large-scale neurocognitive model. The goal was to produce quantitatively similar distributions of system responses to human responses. Tasks were not specifically designed to elicit conflict or surprise, but it was found that modeling these mechanisms increased the fidelity in modeling human behavior.

Tasks 2 and 3 are very similar. Given a map that displays a history of previous attacks from four groups, subjects attempted to assess which group is most likely to attack at a new probe location. Subjects were told to judge the probability of a group attacking based on three features: 1) distance from each group's center to the probe location (the closer the probe location is to a group's centroid, the more likely that group is to attack), 2) the radius associated with each group's attacks (if a probe location is equidistant from two groups' centroids, the group with a larger radius is more likely to attack since that group's region of interest is larger than the other group), and 3) the base rate of each group's activity (with equal distance and radius, the group with the higher base rate is more likely to attack since that group attacks more frequently).

Figure 3A:
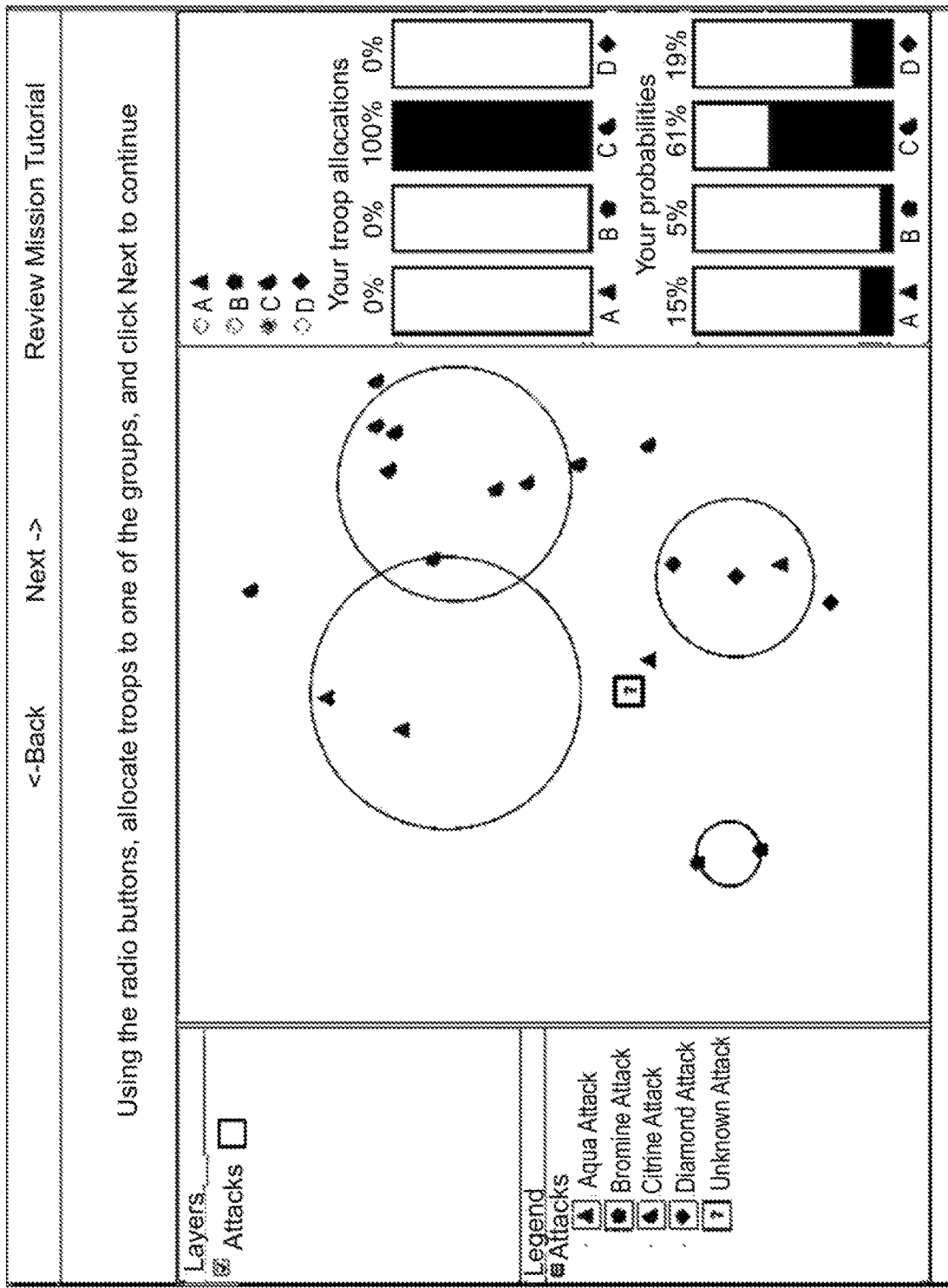
FIG. 3A is a screenshot of task 2 performed by human subjects according to various embodiments of the present invention.
Figure 3B:
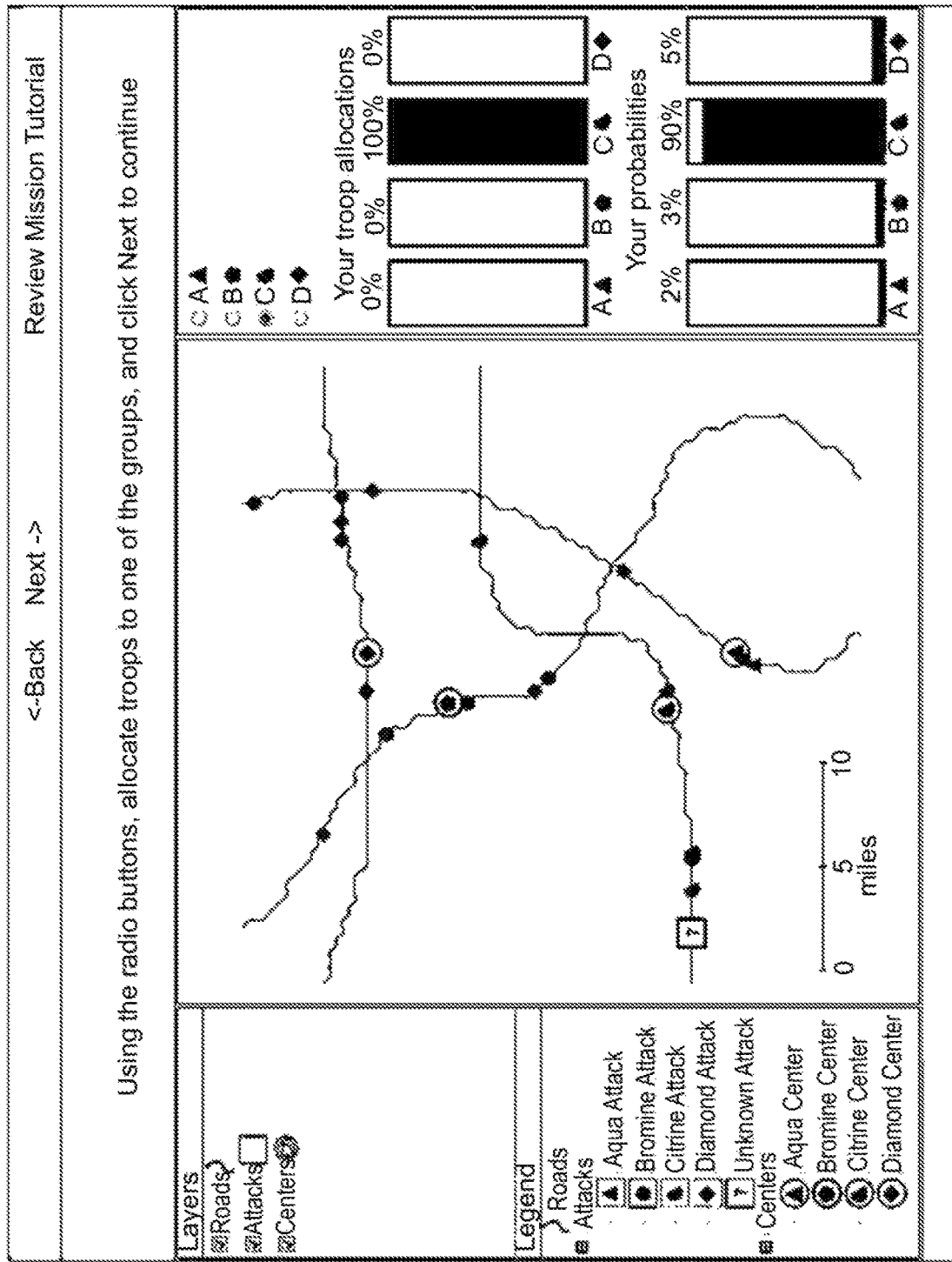
FIG. 3B is a screenshot of task 3 performed by human subjects according to various embodiments of the present invention.

FIGS. 3A and 3B depict screenshots of (a) task 2 and (b) 3 performed by human subjects. In both cases, subjects had to determine the likelihood of a group attacking at a probe location based on distance, radius, and base rate. In task 2, subjects were asked to consider distances "as the crow flies" (FIG. 3A) while in task 3, a network of roads meant subjects had to consider distances "as the cow walks" (FIG. 3B).

Each subject performed five trials, where each trial consisted of a set of twenty attack histories that appeared sequentially as icons on the screen. Each trial built on the last, and events were not erased. Each attack location was determined by a two-dimensional (2D) Gaussian distribution with mean (or center) and variance (or spread) that did not change for the duration of the five trials. Neither the process to generate attack locations nor its parameters were known to the subjects.

(4.2) Model

Figure 4:
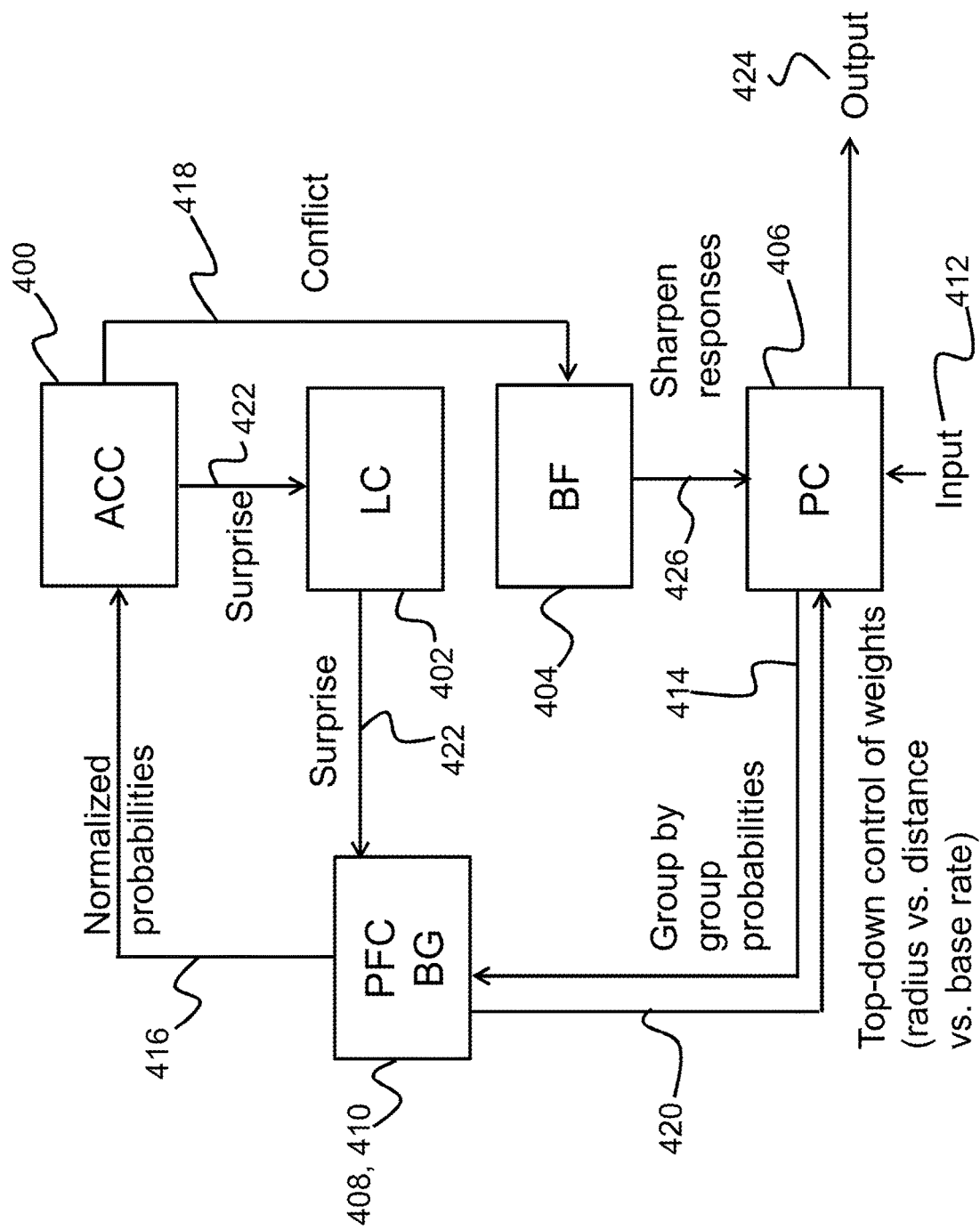
FIG. 4 is a block diagram illustrating a model including frontal cortical areas, neuromodulatory areas, and posterior cortical areas according to various embodiments of the present invention.

The model according to embodiments of the present invention is composed of posterior cortical areas, frontal cortical areas, and neuromodulatory areas, as illustrated in FIG. 4. The areas include an anterior cingulate cortex (ACC) module 400, a locus coeruleus (LC) module 402, a basal forebrain (BF) module 404, a parietal cortex (PC) module 406, a prefrontal cortex (PFC) module 408, and a basal ganglia (BG) module 410. Proactive and reactive control emerges through the interaction of these brain areas. Each of these areas and their functions will be described in further detail below.

(4.2.1) Posterior Cortex: Probability Calculations

Figure 5:
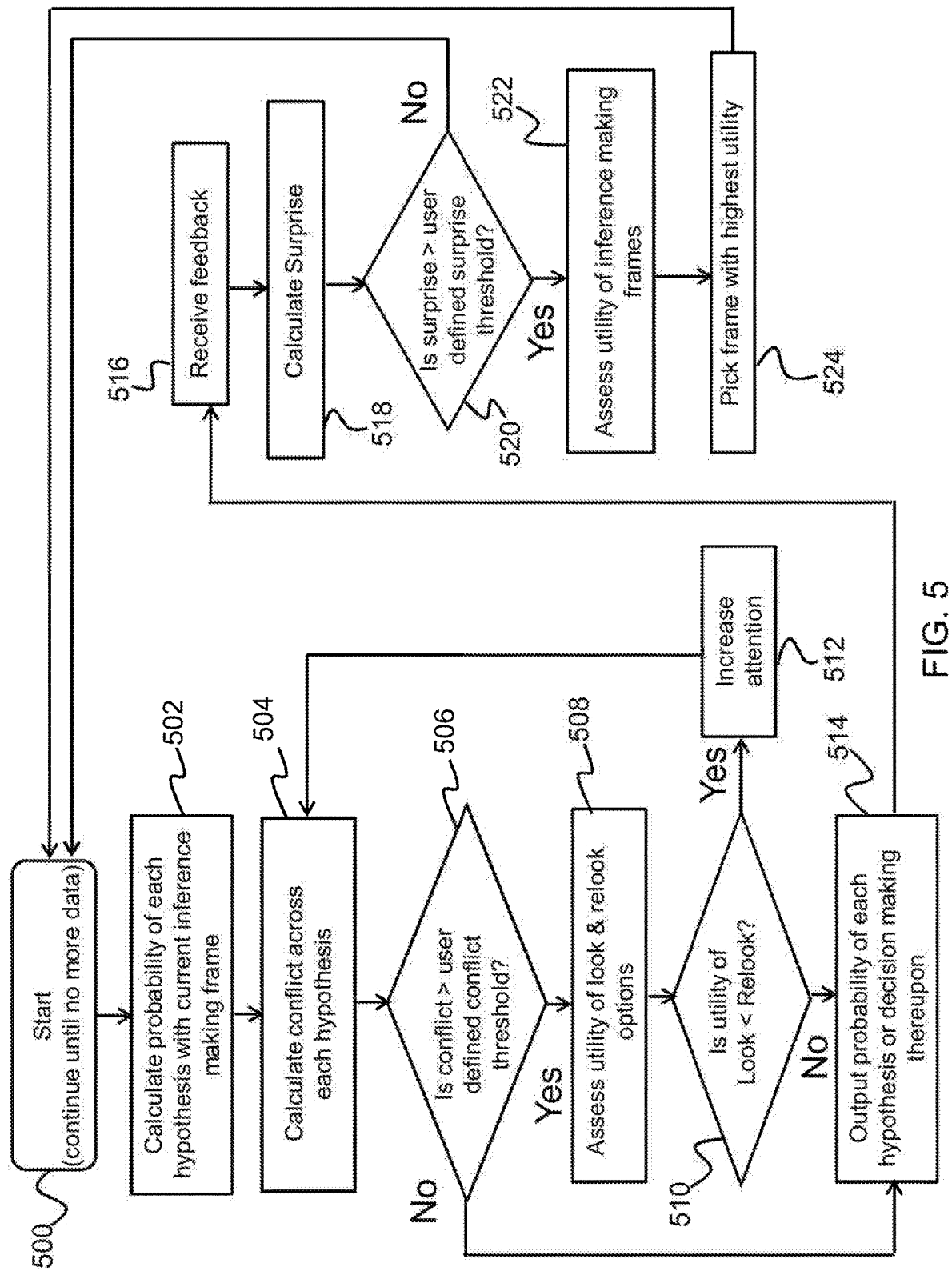
FIG. 5 is a flow chart illustrating a system for modeling proactive and reactive cognitive control according to various embodiments of the present invention.

Referring to FIGS. 4 and 5, within the posterior cortex, the parietal cortex (PC) module 406 is responsible for receiving the input 412 (i.e., the hypotheses of group attacks), calculating the probability that each group was likely to attack at the target location (element 502), and grouping the probabilities 414, the full details of which can be found in Literature Reference No. 27. This calculation took place using either a subset or all of the possible features (i.e., additional information regarding the groups), distance, radius, and base rate, provided (element 524). If a single feature was used, the marginal attack probability estimate was used (e.g., P(attack|Distance)). If more than one feature was used, an average across marginal attack probability estimates was performed (e.g., 0.5*P(attack|Distance)+ 0.5*P(attack|Base rate)). This simulates the blending mechanism that approximates average human behavior when combing two or more sources of information (see Literature Reference No. 19). Attack probability estimates were computed sequentially for all four groups (element 502) and then held in the prefrontal cortex module 408, an area known to be involved in working memory since the 1930s (see, for example, Literature Reference No. 16). Control of which features were used in assessing a group's probability of attack was dictated by other regions of the prefrontal cortex module 408 described in the next section. Group attack probability estimates were also used to perform a resource allocation to defend against potential attacks (see Literature Reference No. 9).

(4.2.2) Prefrontal Cortex: Decision Making for Proactive and Reactive Control

Within the prefrontal cortex (PFC), the orbitofrontal cortex (OFC), anterior cingulate (ACC), and dorsolateral prefrontal cortex (DLPFC) were considered to represent respectively the reward, effort and utility (reward-effort) of strategies in a prefrontal cortex, basal ganglia decision making, or a PBDM network, (see Literature Reference No. 14). The PBDM network tries to balance between strategies with higher reward but often higher effort.

TABLE 1

PFC Options for Proactive and Reactive Control

| | Option 1 | Option 2 | Option 3 | Utility computations |
|---|---|---|---|---|
| Proactive control | "Look": output group attack probability estimates after 1st pass | "Relook": increase attention in PC computation, redo calculations, then output updated group attack probability estimates | — | Reward is constant across the options. Effort is proportional to conflict for option 1 and fixed for the 2nd strategy. As conflict increases, the utility of the "Look" option decreases and the "Relook" option is more likely to be chosen. |
| Reactive control | "Maintain": Maintain current level of PC engagement | "Increase": Increase level of PC engagement | "Randomize": Randomize factors used in PC computation | Reward is constant across the options. Effort is proportional to surprise for option 1 and fixed for the 2nd and 3rd options. As surprise increases, the utility of the "Maintain" option decreases and the "Increase" option is more likely to be chosen. If all PC features are being used in Option 2, the "Randomize" is selected. |

Referring to FIGS. 4 and 5, proactive and reactive control from the other regions of the ACC module 400 of the present invention triggered utility computations in PBDM-like dynamics, as listed in Table 1 above. In the case of proactive control, the PFC module 408 had two options. The first option was "Look" (element 508) and output the first pass of group attack probability estimates (element 514). The second option was to "Relook" (element 510) by increasing attention (element 512) in the PC module 406 computation, reconsider each group in turn (element 504), and then output updated group attack probability estimates (element 514). Using a relook is more effortful but more accurate. This "look-relook" effect aligns with speed-accuracy trade-offs in psychological experiments (e.g., Literature Reference Nos. 18 and 23).

In the case of reactive control, the PFC module 408 controls the use or disuse of features in the PC module 406. There are three options. The first option, "maintain," retains the current level of PC module 406 engagement. The second option, "increase," raises the level of PC module 406 engagement by adding features used in assessing a group's probability of attack. The third option, "randomize," is only used when all PC module 406 features are being used and yet more control is needed; it randomly selects which factors are used in PC module 406 computation. If all factors are being used, the system tries a random sub-set of features in case some of the factors are not helping or interfering with the correct processing. Thus, the PFC module 408 controls the top-down use of weights/features (e.g., base rate, distance, radius) 420. Using more of the features entails greater effort but greater accuracy. However, if no more control can be applied, a random strategy might be tried out of frustration. The normalized probabilities 416 were then sent to the ACC module 400 for further processing, as described below.

(4.2.3) Anterior Cingulate Cortex: Conflict and Surprise

Several subregions of the ACC with different functions have been identified including those for conflict, error, and surprise or unexpectedness (see Literature Reference No. 21). An influential subset of performance monitoring models include conflict models (see Literature Reference No. 7). Typically, conflict 418 is a measure of the incompatibility of opposing responses or actions. Conflict 418 is often measured by energy or the sum across response options. However, for probability distributions, this sum would be constant (e.g., 1). Thus, normalized entropy was chosen to measure conflict (element 504) instead (see Literature Reference No. 9). As examples, the normalized entropy of probabilities (0.25 0.25 0.25 0.25) is 1; for probabilities (1 0 0 0) it is 0.

Surprise 422 was defined by the following formula:

$$\text{surprise} = \begin{cases} \dfrac{\text{error}}{2} & \text{if error} < 0.2 \\ \dfrac{\text{error}}{\text{conflict}} & \text{otherwise} \end{cases}$$

with limits to prevent division by zero or exceeding the value of one. The calculation of surprise is represented by element 518 in FIG. 5. Error refers to the average difference between what the system thought was the correct answer and what is actually the correct answer. When error is small, surprise is also small. However, when errors are larger, surprise is the ratio of error and conflict. Conflict 418 acts as a proxy for uncertainty or lack of confidence in a response. For example, with probabilities (0.25 0.25 0.25 0.25), conflict 418 is high because no response is differentiated from others and confidence is low. On the other hand, with probabilities of (1 0 0 0), conflict 418 is low, so confidence is high. The neurocognitive model is sure that the first option is the true attacker. Other measures of confidence might sum the spread or confidence interval within the probability estimate of each group. Error is the mean of absolute differences (MAD) between ground truth and predictions of the true attacker, while conflict is defined above. For instance, if the system thought the correct answer was (1, 0, 0, 0), meaning that it thought that the first group was 100% the attacker, but the correct answer is (0, 1, 0, 0) meaning that the second group was the attacker, then the error is (1+1+0+0)/4=0.5. For the same error value (e.g., 0.4), surprise scales with confidence. When error is smaller than conflict, surprise 422 is low (e.g., 0.4/0.8=0.5), although since an error was made, there is little confidence in the answer. Conversely, when error exceeds or is the same as conflict 418 (e.g., 0.4/0.4=1), surprise 422 is high. An error was made and the neurocognitive model was confident in its original response. A 3-layer network is trained to perform the calculation. A layer is a group of neurons and an element in the topoplogy of a neural network. A typical 3-layer network would have an input layer, a hidden layer, and an output layer.

(4.2.4) Neuromodulatory System: Basal Forebrain and Locus Coeruleus

ACC module 400 conflict 418 values are relayed to the basal forebrain (BF) module 404. If the activity of the BF module 404 crosses a critical threshold (element 506), it will trigger the programmatic encapsulation of the PBDM to analyze the utility of the two possible options for proactive control (element 508), as in Table 1. When conflict 418 is low, the neurocognitive model provides a direct response output 424 and 514; however, when conflict 418 is high, the neurocognitive model reconsiders, or relooks, at input data 412 and "sharpens" the responses 426 by increasing attention (element 512) before providing the response output 424 and 514. So long as conflict 418 is low, utility will be high for the "Look" strategy and it will continue to be used. However, when conflict 418 is high, utility is low for the "Look" strategy, and the "Relook" strategy has a chance of winning. BF module 404 activity increases attention 512 in the PC module 406 by increasing competition between neurons, effectively increasing the network's signal-to-noise ratio. In Emergent software, increasing competition corresponds to reducing the number of winners in the k-Winner-Take-All (kWTA) mechanism.

ACC module 400 surprise 422 values are relayed to the locus coeruleus (LC) module 402. If the activity of the LC module 402 crosses a critical threshold (element 520), it will trigger the PFC module 408 to analyze the utility of three possible options for reactive control (element 522), as in Table 1. As surprise 422 increases, the utility of the "Maintain" option decreases, and the "Increase" option is more likely to be chosen. If all PC module 406 features are being used in option 2, then "Randomize" is selected. This is meant to model frustration; no more control can be applied and perhaps a random strategy might be worth trying.

The flow chart in FIG. 5 depicts the system according to various embodiments of the present invention. The process begins with a start process 500 that continues until there is no further data to process. In a first operation 502, the system calculates the probability of each hypothesis with the current inference making frame. The current inference making frame is a hypothesis frame. Whatever data is under consideration for the hypothesis is the inference making frame. In a second operation 504, conflict is calculated across each hypothesis. In a third operation 506, the system determines whether the calculated conflict is greater than a user-defined conflict threshold. If the conflict is greater, the utility of look and relook options is assessed in a fourth operation 508. In a fifth operation 510, the system determines if the utility of the look option is less than that of the relook option. If it is, attention is increased in a sixth operation 512, and the system returns to the second operation 504 of calculating conflict across each hypothesis. If the utility of the look option is greater than the relook option, then the system outputs the probability of each hypothesis or decision making in a seventh operation 514. Additionally, if the conflict is less than the user-defined conflict threshold in the third operation 506, the system continues to the seventh operation 514 to output the probability of each hypothesis and use the probabilities in decision making.

In an eighth operation 516, feedback is received followed by a calculation of surprise in a ninth operation 518. Feedback is considered the correct answer. In the seventh operation 514, the system outputs what it considers to be the probability of each hypothesis, which is the feedback. The feedback is used compute error. Next, the system determines whether the calculated surprise is greater than a user-defined surprise threshold in a tenth operation 520. If not, the system returns to the start process 500. If the surprise is greater, then the utility of inference making frames is assessed in an eleventh operation 522. In a twelfth operation 524, the system then picks the frame (hypothesis set) with the highest utility. The highest utility is determined based on expected reward minus cost. If there is additional data to process, the system returns to the start process 500.

(4.3) Experimental Studies (4.3.1) Conflict

Figure 6:
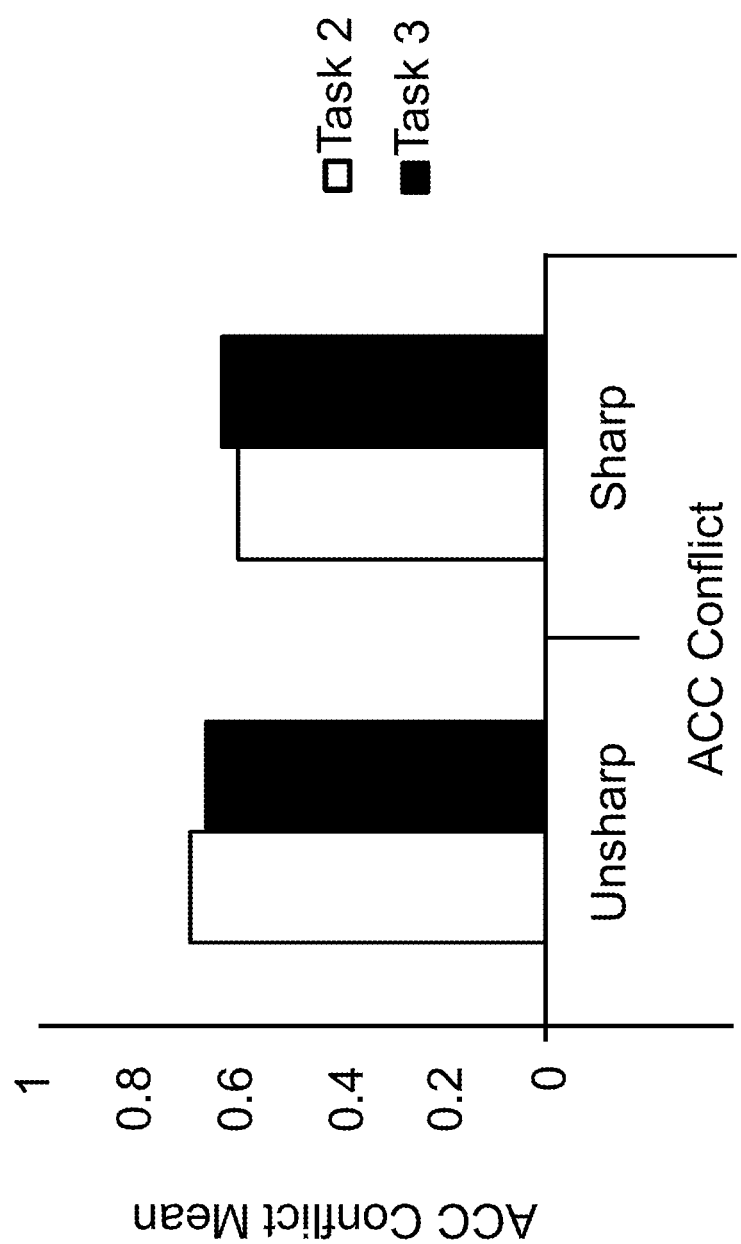
FIG. 6 is a graph illustrating anterior cingulate cortex (ACC) conflict decreasing when the parietal cortex (PC) calculation is changed according to various embodiments of the present invention.
Figure 7:
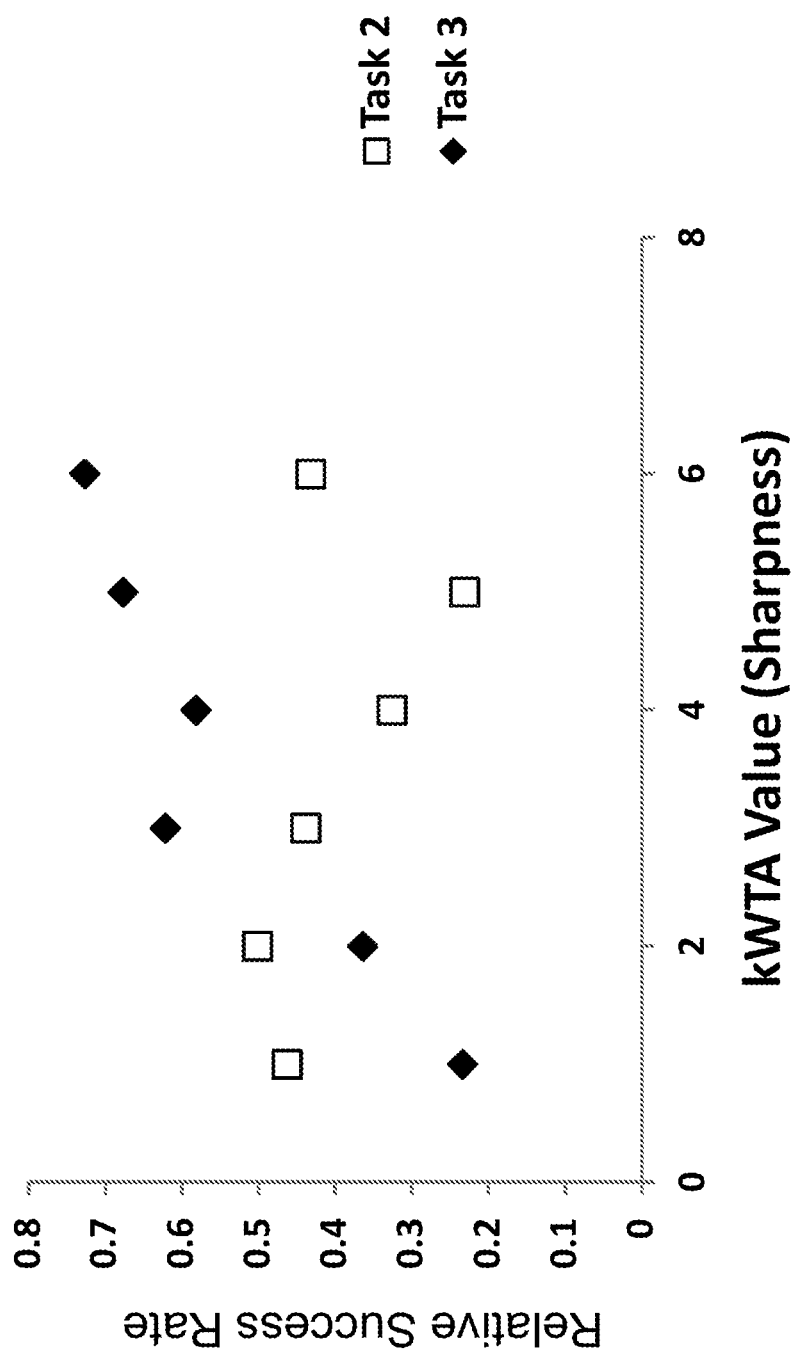
FIG. 7 is a plot chart illustrating relative success rate with varying sharpness of PC layers according to various embodiments of the present invention.

FIG. 6 illustrates ACC module 400 conflict decreasing when the PC module 406 calculation is changed from an unsharp to a sharp state in both tasks 2 and 3. Unsharp refers to "before the relook", while sharp refers to "after the relook". When the ACC module 400 computed high conflict 418 (>0.6), the PC module 406 recalculated the probability of each group with increased attention (element 512). When conflict 418 is calculated again after sharpening of attention (elements 426 and 512) in the PC module 406, there is less conflict 418 (<0.6), and a decision can be made (element 514). For instance, when conflict is low enough, there is a clear decision. When conflict is high, the probabilities are close to equal so that it is not clear which option to choose. Multiple different levels of sharpening (element 426) of the PC module 406 were tested, and it was found that sharpening (element 425) does decrease conflict 418 in both tasks presented, but it only increases accuracy of the PC module 406 calculation in task 3, as shown in FIG. 7. In task 2, sharpening (element 426) has little, or even detrimental, changes to the accuracy of the calculation. In FIG. 7, accuracy is measured in relative success rate, a measure of how well models fit human responses described in Lebiere et al. (see Literature Reference No. 20). The detrimental changes occur in this task because the differences in group probability estimates between the groups was below the range of error for PC module 406 calculation even in the sharpened condition. Therefore, even though conflict 418 decreases, the calculation actually worsens.

(4.3.2) Surprise

Figure 8A:
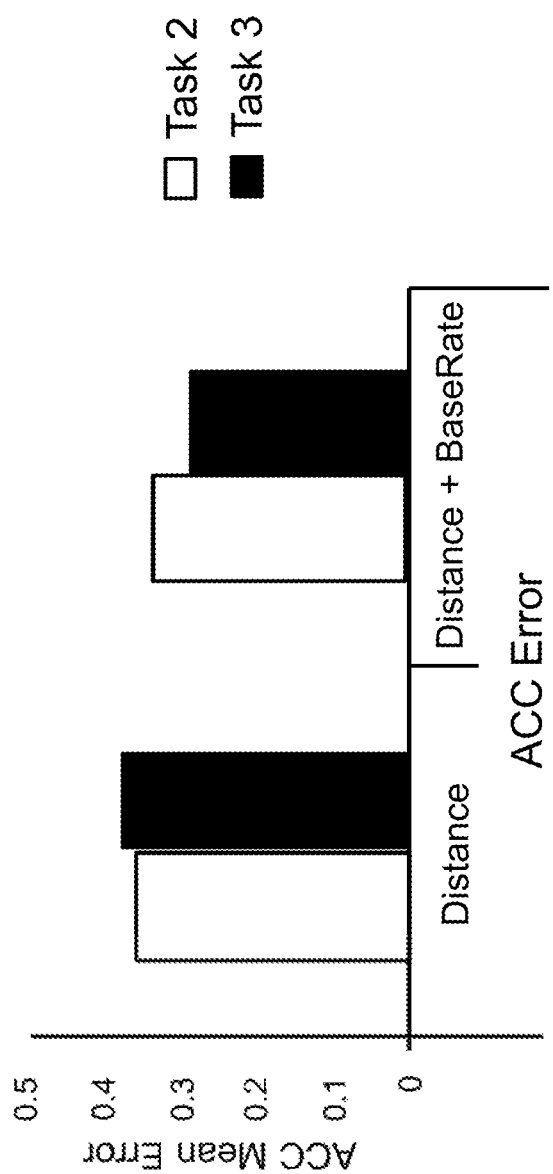
FIG. 8A is a graph illustrating ACC error comparing distance to distance plus base rate according to various embodiments of the present invention.
Figure 8B:
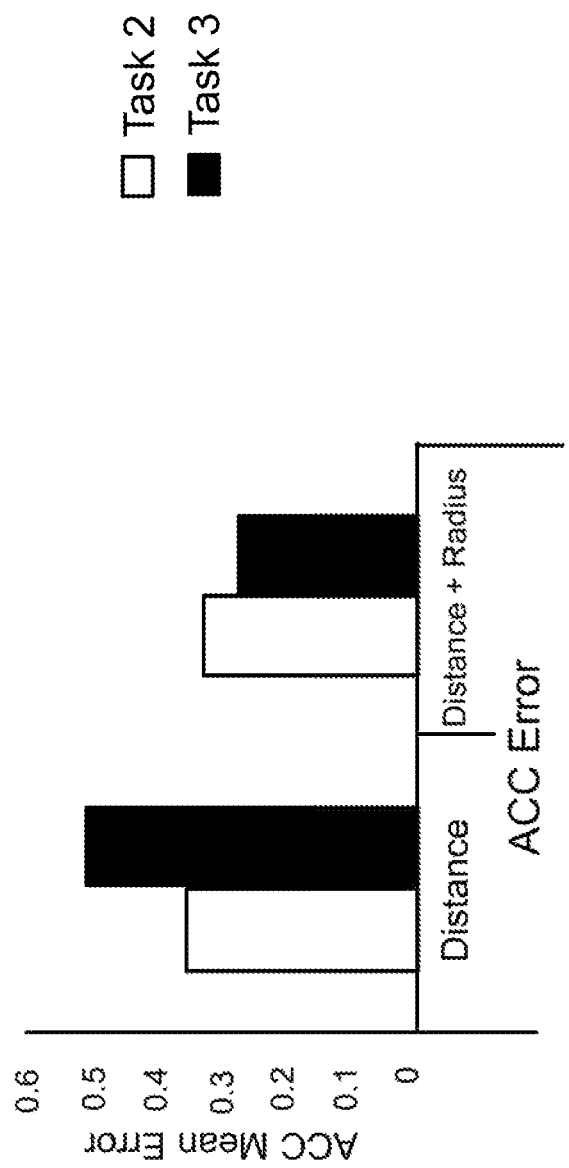
FIG. 8B is a graph illustrating ACC error comparing distance to distance plus radius according to various embodiments of the present invention.
Figure 9:
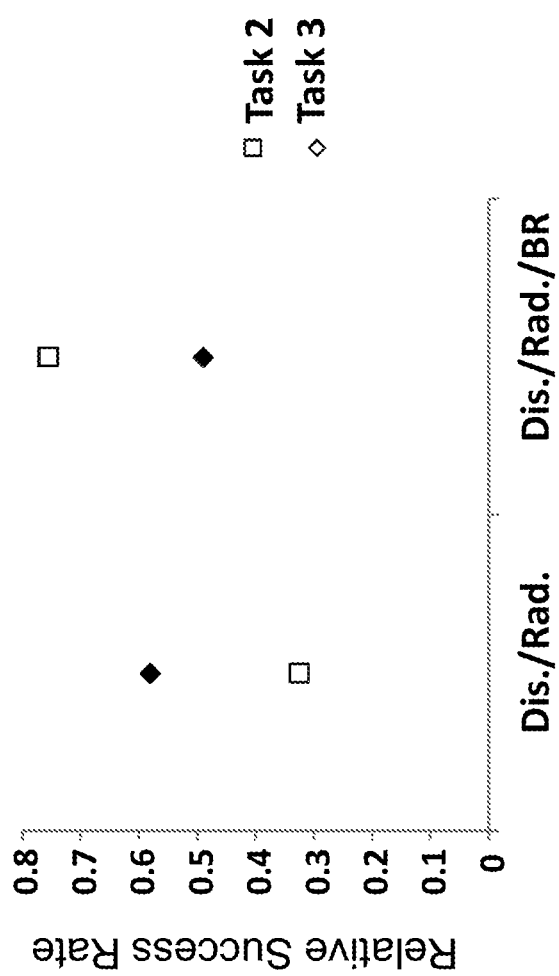
FIG. 9 is a plot chart illustrating relative success rate with varying group information added according to various embodiments of the present invention.

In addition to conflict 418, when the result of the previous trial results in surprise 422, the ACC module 400 mean error reaches a threshold and additional resources are used within the PC module 406 to better calculate future trials. FIGS. 8A and 8B show that the ACC module 400 mean error decreases in both tasks 2 and 3 when either base rate or radius is added to the distance only calculation to provide more information on each group. After high error and surprise 422 levels, the model selects more features to be used in future trials. On average this causes a decrease in mean error to occur in both tasks. Similarly, as with conflict 418, the addition of additional information may end up helping or hurting the final solution, as shown in FIG. 9. In task 2, when the neurocognitive model is already using distance and radius, a surprising result causes the PBDM to instruct the PC module 406 to use additional information (e.g., base rate), which highly increases the accuracy of the calculation with respect to human responses. However, in task 3 if the neurocognitive model is surprised 422 and the PBDM requests additional information, the results worsen. This result would cause additional surprise 422 resulting in the PFC module 408 resetting its expectations and no longer requesting the use of base rate in future calculations.

Typically, models of cognitive control are demonstrated on simple tasks such as the Stroop task (see Literature Reference No. 26). However in the present invention, it was determined that proactive and reactive control produces better fits to human data in relatively complicated inference and decision-making tasks. Furthermore, in the model according to various embodiments of the present invention, cognitive control was coordinated across several brain areas such as the posterior cortex, the frontal cortical areas, and the neuromodulatory areas. When group attack estimates were relatively undifferentiated, conflict 418 was high. High conflict 418 was relayed from the ACC module 400 to the BF module 404 to increase attention 512 in the PC module 406. Increased competition in the PC module 406, in turn, led to more distinction between response options and greater overall success in matching human performance of predicting attackers. When group attack estimates were incorrect, surprise 422 was high. This was relayed from the ACC module 400 to the LC module 402 to trigger a re-evaluation of the spatial strategies used by the PC module 406. More terms in the spatial strategy, in turn, drove down error.

With respect to the ACC module 400, the model of the present invention uses conflict 418 and surprise 422 to initiate proactive and reactive control, respectively. Broader theories of the ACC such as PRO (see Literature Reference No. 3) and EVC (see Literature Reference No. 25) attempt to unify several cognitive control functions of the ACC, including conflict and surprise, with various objective functions. These models are also tied to neuroimaging and neurophysiological studies but do not discuss the effects of the neuromodulatory system.

With respect to neuromodulators, Doya (see Literature Reference No. 12) has also presented alternate interpretations of the neuromodulatory functions. In his work, dopamine signals reward prediction errors, serotonin controls the time scale of reward prediction (discounting), acetylcholine controls the speed of memory update, and noradrenaline controls the randomness in action selection. In addition, Doya's work primarily considers reactive control in a reinforcement learning framework. Acetylcholinergic and noradrenergic effects for modulating attention in visual processing were modeled by Avery et al. (see Literature Reference Nos. 4 and 5). The latter work also uses detailed anatomical models of the primary visual area or V1.

Modeling proactive and reactive cognitive control has applications to corporations that develop and manufacture vehicles. For instance, the system described herein can be used for cognitive control for autonomous vehicles or robots. The model can also be used to simulate cognitive control in other agents for use by autonomous vehicles or robots. Furthermore, the present invention can be used in modeling cognitive control in drivers (e.g., when to proactively brake before hitting a car) and modeling cognitive control in pilots (e.g., when to proactively correct a deviation from a desired flight path).

Modeling cognitive control among human subjects is a topic of interest. For example, some research is concerned with detecting biases in image analysts which may be precipitated by different cognitive control strategies. The system according to embodiments of the present invention can be integrated into the systems described above, as it is as an all-software solution.

What is claimed is:

1. A system for proactive and reactive cognitive control, the system comprising:
    a spike domain circuit operating as a neural module, such that the spike domain circuit is responsive to at least one of analog and spike domain input signals; and
    one or more processors and a non-transitory memory having instructions encoded thereon such that when the instructions are executed, the one or more processors perform operations of:
        using a parietal cortex (PC) module of the neural module, calculating for each hypothesis of a set of hypotheses a probability that an event will occur, resulting in a set of event probabilities, the neural module comprising a plurality of neurons, a prefrontal cortex (PFC) module, an anterior cingulate cortex (ACC) module, a locus coeruleus (LC) module, and a basal forebrain (BF) module, the set of hypotheses relating to tasks to be performed by a plurality of groups, each group having a corresponding hypothesis,
        wherein each of the PC module, the PFC module, the ACC module, the LC module, and the BF module comprises a plurality of neurons;
        wherein for each calculated probability, performing a proactive cognitive control operation and a reactive cognitive control operation based on a measure of conflict and a measure of surprise, respectively,
        where in performing the proactive cognitive control operation, the one or more processors further perform operations of:
            calculating a conflict value across all hypotheses with the ACC module;
            comparing each conflict value to a predetermined threshold using the BF and LC modules;
            based on the comparison, relaying conflict values that exceed the predetermined threshold from the ACC module to the BF module to increase attention in the PC module; and
            calculating a new conflict value across all hypotheses following an increase in attention in the PC module, and outputting an updated probability.

2. The system as set forth in claim 1, where in performing the reactive cognitive control operation, the one or more processors further perform operations of:
    calculating a surprise value for the probability with the ACC module and wherein the probability contains an error;
    improving the calculation of the probability using additional resources and wherein the surprise value exceeds a predetermined threshold; and
    using the set of probabilities for decision making related to the event.

3. The system as set forth in claim 2, wherein the PFC module is used to assess a utility of each of a set of options for reactive cognitive control, and select the option having the highest utility to improve the calculation of the probability in a subsequent trial.

4. The system as set forth in claim 3, wherein the set of options comprises a maintain option that maintains a current level of PC module engagement, an increase option that increases the level of PC module engagement by providing additional information regarding the plurality of groups, and a randomize option that is selected when all additional information regarding the plurality of groups has been utilized.

5. The system as set forth in claim 1, wherein conflict values that exceed the predetermined threshold are relayed from the ACC module to the BF module to increase attention in the PC module through an increase in competition between a plurality of neurons, thereby increasing distinction between probabilities.

6. The system as set forth in claim 2, wherein surprise values that exceed the predetermined threshold are relayed from the ACC module to the LC module to trigger a re-evaluation of spatial strategies used by the PC module.

7. A computer-implemented method for proactive and reactive cognitive control, comprising:
an act of causing one or more processors to execute instructions stored on a non-transitory memory such that upon execution, the one or more processors perform operations of:
using a parietal cortex (PC) module of the neural module, calculating for each hypothesis of a set of hypotheses a probability that an event will occur, resulting in a set of event probabilities, the neural module comprising a plurality of neurons, a prefrontal cortex (PFC) module, an anterior cingulate cortex (ACC) module, a locus coeruleus (LC) module, and a basal forebrain (BF) module, the set of hypotheses relating to tasks to be performed by a plurality of groups, each group having a corresponding hypothesis,
wherein each of the PC module, the PFC module, the ACC module, the LC module, and the BF module comprises a plurality of neurons;
wherein for each calculated probability, performing a proactive cognitive control operation and a reactive cognitive control operation based on a measure of conflict and a measure of surprise, respectively,
where in performing the proactive cognitive control operation, the one or more processors further perform operations of:
calculating a conflict value across all hypotheses with the ACC module;
comparing each conflict value to a predetermined threshold using the BF and LC modules;
based on the comparison, relaying conflict values that exceed the predetermined threshold from the ACC module to the BF module to increase attention in the PC module; and
calculating a new conflict value across all hypotheses following an increase in attention in the PC module, and outputting an updated probability.

8. The method as set forth in claim 7, where in performing the reactive cognitive control operation, the one or more processors further perform operations of:
calculating a surprise value for the probability with the ACC module and wherein the probability contains an error;
improving the calculation of the probability using additional resources and wherein the surprise value exceeds a predetermined threshold; and
using the set of probabilities for decision making related to the event.

9. The method as set forth in claim 8, wherein the PFC module is used to assess a utility of each of a set of options for reactive cognitive control, and select the option having the highest utility to improve the calculation of the probability in a subsequent trial.

10. The method as set forth in claim 9, wherein the set of options comprises a maintain option that maintains a current level of PC module engagement, an increase option that increases the level of PC module engagement by providing additional information regarding the plurality of groups, and a randomize option that is selected when all additional information regarding the plurality of groups has been utilized.

11. The method as set forth in claim 7, wherein conflict values that exceed the predetermined threshold are relayed from the ACC module to the BF module to increase attention in the PC module through an increase in competition between a plurality of neurons, thereby increasing distinction between probabilities.

12. The method as set forth in claim 8, wherein surprise values that exceed the predetermined threshold are relayed from the ACC module to the LC module to trigger a re-evaluation of spatial strategies used by the PC module.

13. A computer program product for proactive and reactive cognitive control, the computer program product comprising:
computer-readable instructions stored on a non-transitory computer-readable medium that are executable by a computer having one or more processors for causing the processor to perform operations of:
using a parietal cortex (PC) module of the neural module, calculating for each hypothesis of a set of hypotheses a probability that an event will occur, resulting in a set of event probabilities, the neural module comprising a plurality of neurons, a prefrontal cortex (PFC) module, an anterior cingulate cortex (ACC) module, a locus coeruleus (LC) module, and a basal forebrain (BF) module, the set of hypotheses relating to tasks to be performed by a plurality of groups, each group having a corresponding hypothesis,
wherein each of the PC module, the PFC module, the ACC module, the LC module, and the BF module comprises a plurality of neurons;
wherein for each calculated probability, performing a proactive cognitive control operation and a reactive cognitive control operation based on a measure of conflict and a measure of surprise, respectively,
where in performing the proactive cognitive control operation, the one or more processors further perform operations of:
calculating a conflict value across all hypotheses with the ACC module;
comparing each conflict value to a predetermined threshold using the BF and LC modules;
based on the comparison, relaying conflict values that exceed the predetermined threshold from the ACC module to the BF module to increase attention in the PC module; and
calculating a new conflict value across all hypotheses following an increase in attention in the PC module, and outputting an updated probability.

14. The computer program product as set forth in claim 13, where in performing the reactive cognitive control operation, the one or more processors further perform operations of:
calculating a surprise value for the probability with the ACC module and wherein the probability contains an error;
improving the calculation of the probability using additional resources and wherein the surprise value exceeds a predetermined threshold; and
using the set of probabilities for decision making related to the event.

15. The computer program product as set forth in claim 14, wherein the PFC module is used to assess a utility of each of a set of options for reactive cognitive control, and select the option having the highest utility to improve the calculation of the probability in a subsequent trial.

16. The computer program product as set forth in claim 15, wherein the set of options comprises a maintain option that maintains a current level of PC module engagement, an increase option that increases the level of PC module engagement by providing additional information regarding the plurality of groups, and a randomize option that is selected when all additional information regarding the plurality of groups has been utilized.

17. The computer program product as set forth in claim 13, wherein conflict values that exceed the predetermined threshold are relayed from the ACC module to the BF module to increase attention in the PC module through an increase in competition between a plurality of neurons, thereby increasing distinction between probabilities.

18. The computer program product as set forth in claim 14, wherein surprise values that exceed the predetermined threshold are relayed from the ACC module to the LC module to trigger a re-evaluation of spatial strategies used by the PC module.

* * * * *